(12) United States Patent  
Campbell et al.

(10) Patent No.: US 9,189,305 B2  
(45) Date of Patent: Nov. 17, 2015

(54) DURABLE SUBSCRIPTIONS IN PUBLISH/SUBSCRIBE MESSAGING

(71) Applicant: International Business Machines Corporation, Armonk, NY (US)

(72) Inventors: Mark J. Campbell, Hursley (GB); Geoffrey M. Winn, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/173,657

(22) Filed: Feb. 5, 2014

(65) Prior Publication Data

US 2014/0289740 A1 Sep. 25, 2014

(30) Foreign Application Priority Data

Mar. 20, 2013 (GB) .................................. 1305110.7

(51) Int. Cl.
*G06F 3/00* (2006.01)
*G06F 9/54* (2006.01)
*H04L 12/58* (2006.01)

(52) U.S. Cl.
CPC ................ *G06F 9/546* (2013.01); *H04L 12/58* (2013.01)

(58) Field of Classification Search
CPC .................................... G06F 9/54; G06F 9/546
USPC .......................................................... 719/313
See application file for complete search history.

(56) References Cited

U.S. PATENT DOCUMENTS

| 6,119,014 | A  | * | 9/2000 | Alperovich et al. ........... 455/466 |
| 6,871,067 | B2 | * | 3/2005 | Clark et al. .................... 455/428 |
| 7,412,493 | B2 |   | 8/2008 | Duigenan et al. |
| 7,487,246 | B2 |   | 2/2009 | Astley et al. |
| 8,023,498 | B2 | * | 9/2011 | Preston et al. ................. 370/352 |
| 2002/0194347 | A1 |   | 12/2002 | Koo et al. |
| 2005/0256931 | A1 | * | 11/2005 | Follmeg et al. ................ 709/206 |
| 2006/0069587 | A1 |   | 3/2006 | Banks et al. |
| 2008/0133337 | A1 |   | 6/2008 | Fletcher et al. |
| 2008/0263221 | A1 |   | 10/2008 | Xiao et al. |
| 2011/0099232 | A1 |   | 4/2011 | Gupta et al. |
| 2011/0161382 | A1 |   | 6/2011 | Ayres et al. |
| 2011/0258268 | A1 |   | 10/2011 | Banks et al. |
| 2014/0335823 | A1 | * | 11/2014 | Heredia et al. ................ 455/411 |

FOREIGN PATENT DOCUMENTS

EP 2461545 A1 6/2012

OTHER PUBLICATIONS

Hubert Ka Yau Leung, Efficient Matching for State-Persistent Publish/Subcribe Systems, 2003.*

(Continued)

*Primary Examiner* — Lechi Truong
(74) *Attorney, Agent, or Firm* — Yee & Associates, P.C.; Parashos T. Kalaitzis

(57) ABSTRACT

Durable subscriptions in publish/subscribe messaging are provided. A durable subscription is received for a subscribing application. The durable subscription includes a parameter defining persistence for which a subscription is to be durable. It is detected whether the subscribing application is disconnected. In response to detecting that the subscribing application is disconnected, a filter is applies to messages to determine whether a message meets a defined persistence requirement. Only persistent messages are retained for delivery once the subscribing application is reconnected.

9 Claims, 3 Drawing Sheets

(56) References Cited

OTHER PUBLICATIONS

Bhola et al., "Scalably Supporting Durable Subscriptions in a Publish/Subscribe System," 2003 International Conference on Dependable Systems and Networks, Jun. 2003, 10 pages.

Corsaro et al., "Quality of Service in Publish/Subscribe Middleware," Global Data Management, Apr. 2006, 22 pages.

UK Intellectual Property Office Search Report regarding Application No. GB1305110.7, dated Sep. 30, 2013, 4 pages.

Zhao et al., "Dynamic Access Control in a Content-based Publish/Subscribe System with Delivery Guarantees," 26th IEEE International Conference on Distributed Computing Systems, Jul. 2007, 8 pages.

Zhao et al., "Subscription Propagation in Highly-Available Publish/Subscribe Middleware," ACM/IFIP/USENIX International Middleware Conference, Oct. 2004, 20 pages.

* cited by examiner

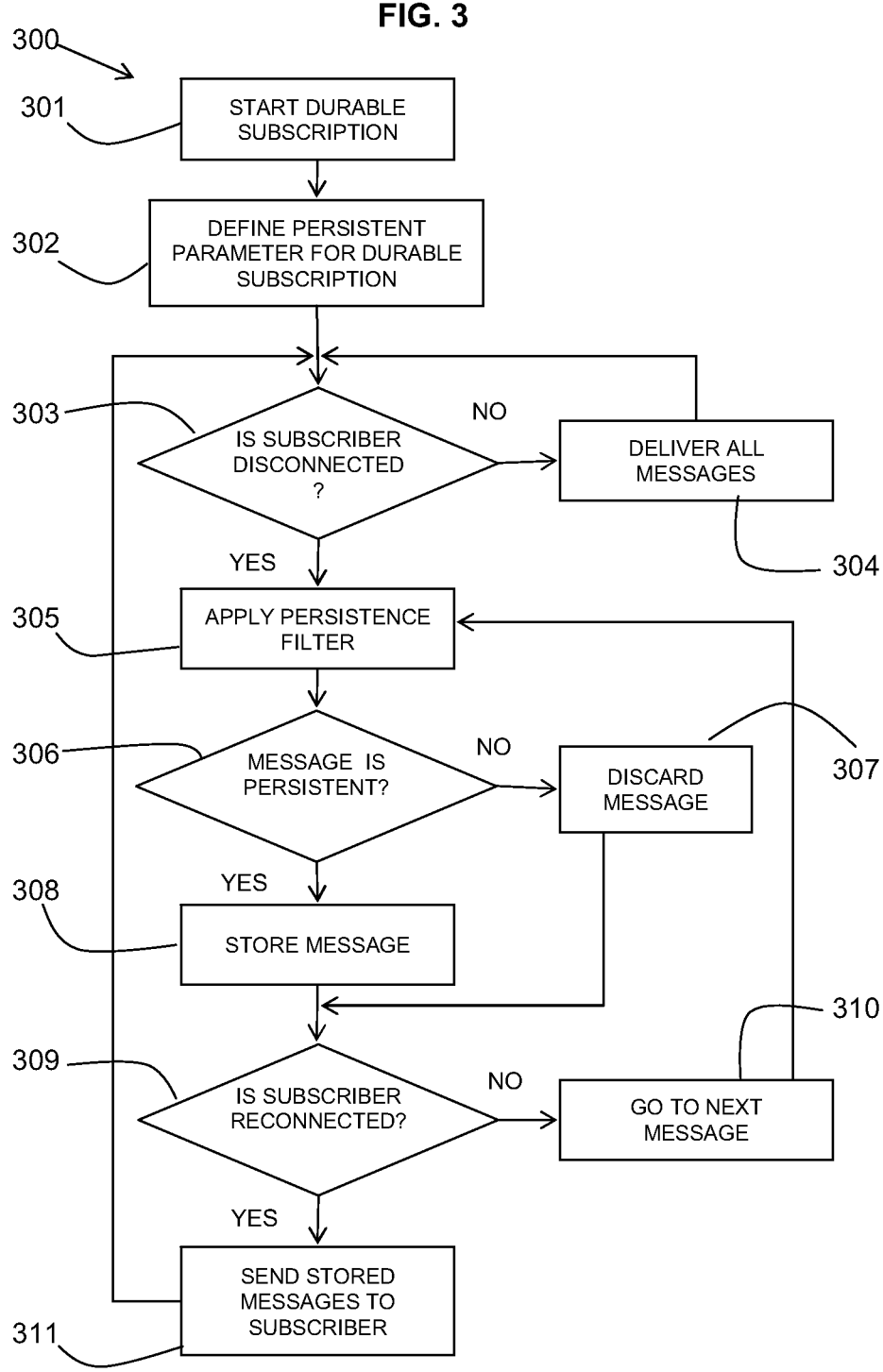

DURABLE SUBSCRIPTIONS IN PUBLISH/SUBSCRIBE MESSAGING

This Application is a counterpart of and claims the benefit of priority to United Kingdom Patent Office Application Serial No. GB 1305110.7, filed on Mar. 20, 2013, the contents of which are hereby incorporated by reference.

BACKGROUND

1. Field

This invention relates to the field of publish/subscribe messaging. In particular, the invention relates to durable subscriptions in publish/subscribe messaging.

2. Description of the Related Art

In a messaging system that uses publish and subscribe, it is well established that subscribers can make durable or non-durable subscriptions. A non-durable subscription is one that is active only while the subscribing application is connected to the publish/subscribe engine. However, a durable subscription persists even if the subscribing application disconnects from the publish/subscribe engine for a time.

Publish/subscribe implementations that offer durable subscriptions are required to retain all the published messages that are destined for the durable subscription until the subscribing application re-connects. At that point the engine must supply to the re-connected application all the messages that were published to its durable subscription while it was disconnected. In this way, an application is assured that it will never miss a message, although it may receive some messages some time after they were originally published.

The main disadvantage of this arrangement is that it obliges the publish/subscribe engine to store a sequence of messages as they are published until the consuming application reconnects. If the application remains disconnected for a long time, or if the publication rate is extremely high, then the engine may find that it simply cannot store any more messages. At this point it has two options; it either discards messages or it notifies the publishing applications to stop sending messages. The former violates the assurance that clients will never lose a message and the latter penalises the publishing applications and other subscribers.

Therefore, there is a need in the art to address the aforementioned problems.

SUMMARY

According to a first aspect of the present invention there is provided a method for durable subscriptions in publish/subscribe messaging, comprising: receiving a durable subscription for a subscribing application, wherein the durable subscription includes a parameter defining persistence for which the subscription is to be durable; detecting if the subscribing application is disconnected and, if disconnected, applying a filter to the messages to determine if a message meets a defined persistence requirement; and retaining only persistent messages for delivery once the subscribing application is reconnected.

The method may include: detecting that the subscribing application is reconnected; and delivering the retained persistent messages.

The parameter defining persistence may be in the form of a property attached to a message. The parameter defining persistence may provide a range of persistence values determining how the message is to be treated by a durable subscription.

In one embodiment, the parameter defining persistence may be a quality of service value. The defined persistence requirement may be one or more quality of service values.

According to a system for durable subscriptions in publish/subscribe messaging, comprising: a matching engine having a durable subscription component for receiving a durable subscription for a subscribing application, wherein the durable subscription includes a parameter defining persistence for which the subscription is to be durable; the durable subscription component including: a connection monitoring component for detecting if the subscribing application is disconnected; a persistence filter component for filtering subscription messages to determine if a message meets a defined persistence requirement; and a message store for retaining only persistent messages for delivery once the subscribing application is reconnected.

The connection monitoring component may include detecting that the subscribing application is reconnected; and the durable subscription component delivering the retained persistent messages when the subscribing application is reconnected.

The parameter defining persistence may be in the form of a property attached to a message. The parameter defining persistence may provide a range of persistence values determining how the message is to be treated by a durable subscription.

In one embodiment, the parameter defining persistence may be a quality of service value. The defined persistence requirement may be one or more quality of service values.

According to a third aspect of the present invention there is provided a computer program product for durable subscriptions in publish/subscribe messaging, the computer program product comprising: a computer readable storage medium readable by a processing circuit and storing instructions for execution by the processing circuit for performing a method according to the first aspect of the present invention.

According to a fourth aspect of the present invention there is provided a computer program stored on a computer readable medium and loadable into the internal memory of a digital computer, comprising software code portions, when said program is run on a computer, for performing the method of the first aspect of the present invention.

According to a fifth aspect of the present invention there is provided a method substantially as described with reference to the figures.

According to a sixth aspect of the present invention there is provided a system substantially as described with reference to the figures.

The described aspects of the invention provide the advantage of postponing the time when the publish/subscribe engine must choose between refusing publications and discarding messages.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which:

FIG. 3 is a flow diagram of an example embodiment of an aspect of a method in accordance with the present invention.

DETAILED DESCRIPTION OF THE DRAWINGS

Figure 1:
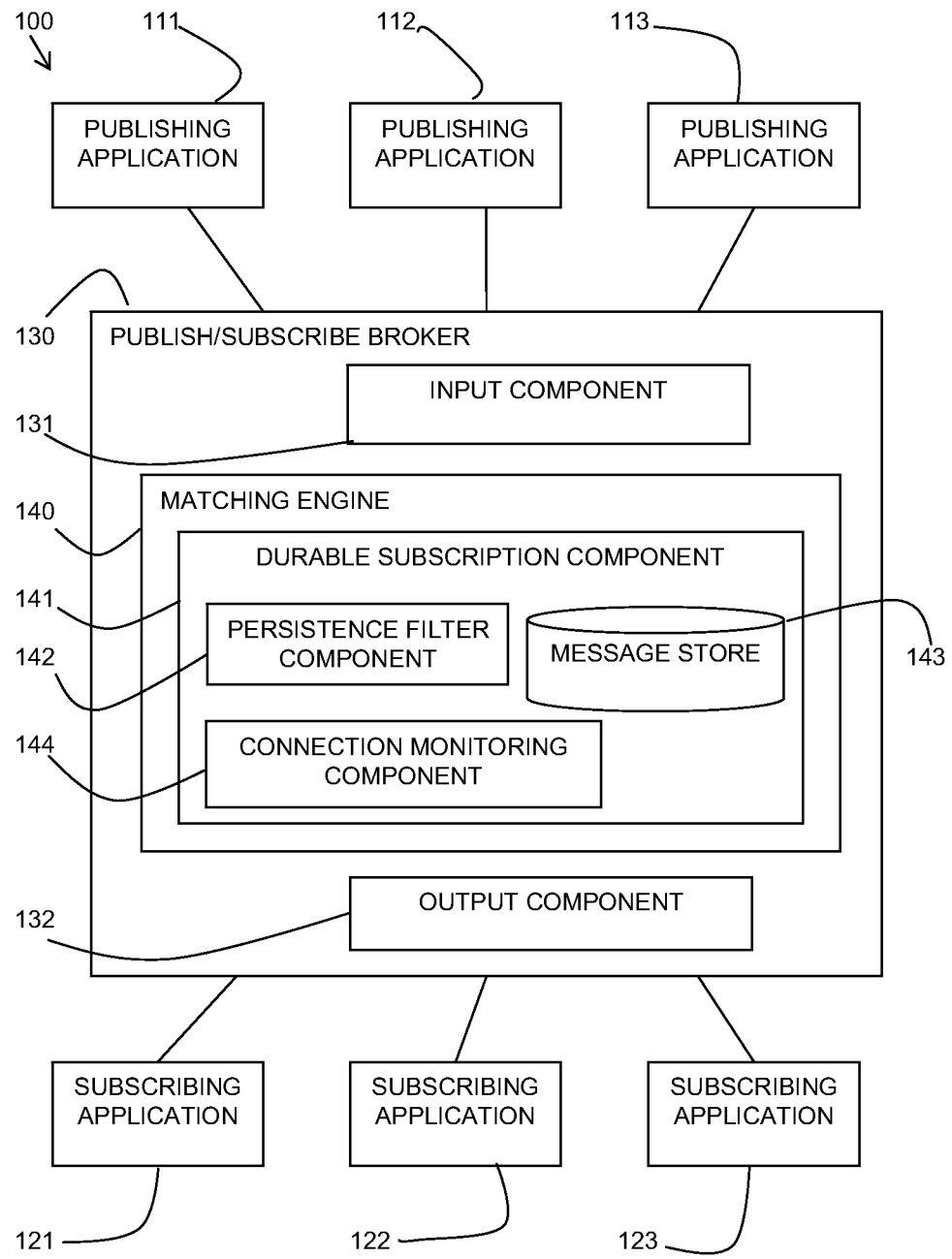
FIG. 1 is block diagram of an example embodiment of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A publish/subscribe method and system are described for managing a durable subscription and improving the quality of service. In the described method, a persistent (quality of service) parameter is defined for the durable subscription. Only persistent messages are retained while a subscriber with the durable subscription is disconnected and the persistent messages are delivered when the subscriber re-connects.

This is done by adding a filter to the particular case of a durable subscription, whose consuming application is not currently connected, the filter allows for any message that fails to meet the persistence requirement specified by the subscription will not be sent to that particular subscriber.

Messaging systems normally attach to each message a property that defines whether it is permissible to discard this message and the circumstances in which this might occur. In the simplest case, this property will be called something like "persistence" and each message will be either persistent or non-persistent. A persistent message must never be discarded. However, a non-persistent message might be discarded, for example, when one computer in a messaging system crashes.

Even for non-persistent messages, message loss should be uncommon Non-persistent messages can typically be delivered more quickly and are particularly suitable for messages that deliver frequent updates. Therefore, if one message is lost, it will quickly be superseded by a following message.

Another term often used for this characteristic of a message is "Quality of Service", which usually has more than two possible states.

The presence of this type of characteristic means that the subscribe operation may be modified so that a durable subscription includes a parameter defining the persistence (or quality of service) for which the subscription is to be durable.

In the case of a simple model where messages are either persistent or non-persistent, the subscriber would have the following options:

retain no messages if the subscriber disconnects (this is a conventional non-durable subscription);

retain all messages while a subscriber is disconnected and deliver them when the subscriber re-connects (this is a conventional durable subscription);

retain only persistent messages while a subscriber is disconnected and deliver them when the subscriber re-connects;

in principle, there might be a fourth option to retain non-persistent messages and discard persistent but this is contrary to the intended behaviour of both persistent and non-persistent messages.

The third option above allows the subscriber finer grained control over which messages will be retained and which discarded.

This option provides two clear benefits:

Since only a subset of published messages are being retained, the publish/subscribe engine will take longer to reach the limit of its ability to store messages.

The subscribing application might genuinely not want to see the non-persistent messages. If the messages represent frequent updates to some value (for example, an exchange rate, or stock price), it may well be that the application only wants to know the most recent value. Excluding these messages from the durable set ensures that the application has fewer messages to process as part of reconnecting.

Any publish/subscribe engine will already implement an algorithm to efficiently decide which published messages must be copied to which subscribers. In the particular case of a durable subscription whose consuming application is not currently connected, an additional filter is added to the algorithm so that any message that fails to meet the persistence requirement specified by the subscription will not be sent to that particular subscriber.

Referring to FIG. 1, a block diagram shows an example embodiment of the described system 100.

A publish/subscribe system 100 may have multiple publishing applications 111, 112, and 113 and multiple subscribing applications 121, 122, and 123 with a publish/subscribe broker 130 which controls the delivery of messages from publishing applications 111-113 to subscribing applications 121-123. A publishing application 111-113 may also be a subscribing application 121-123.

The publish/subscribe broker 130 may have an input component 131 for receiving published messages from publishing applications 111-113 and an output component 132 for sending messages to subscribing applications 121-123.

The publish/subscribe broker 130 may include a matching engine 140 for applying an algorithm to determine which published messages should be sent to which subscribing applications 121-123. The matching engine 140 may use subscriptions based on topics, content, specific publishing applications, etc.

The matching engine 140 may include a durable subscription component 141 which enables durable subscriptions. Durable subscriptions continue to exist when the subscribing application 121-123 is disconnected from the publish/subscribe broker 130.

The durable subscription component 141 may include a connection monitoring component 144 to detect when a subscribing application 121-123 is not connected. The matching engine 140 may retain all the published messages that are destined for a durable subscription for a subscribing application 121-123 that is not connected until the subscribing application 121-123 re-connects. At that point the matching engine 140 may supply to the re-connected application all the messages that were published to its durable subscription while it was disconnected. The durable subscription component 141 may include a message store 143 for storing messages for a disconnected durable subscription.

The durable subscription component 141 may include a persistence filter component 142. The persistence filter component 142 may filter published messages destined for a durable subscription of a disconnected subscribing application. Published messages may include a persistence parameter defined for a durable subscription and the filter component 142 may discard any published messages which do not meet the persistence requirement for the durable subscription.

Figure 2:
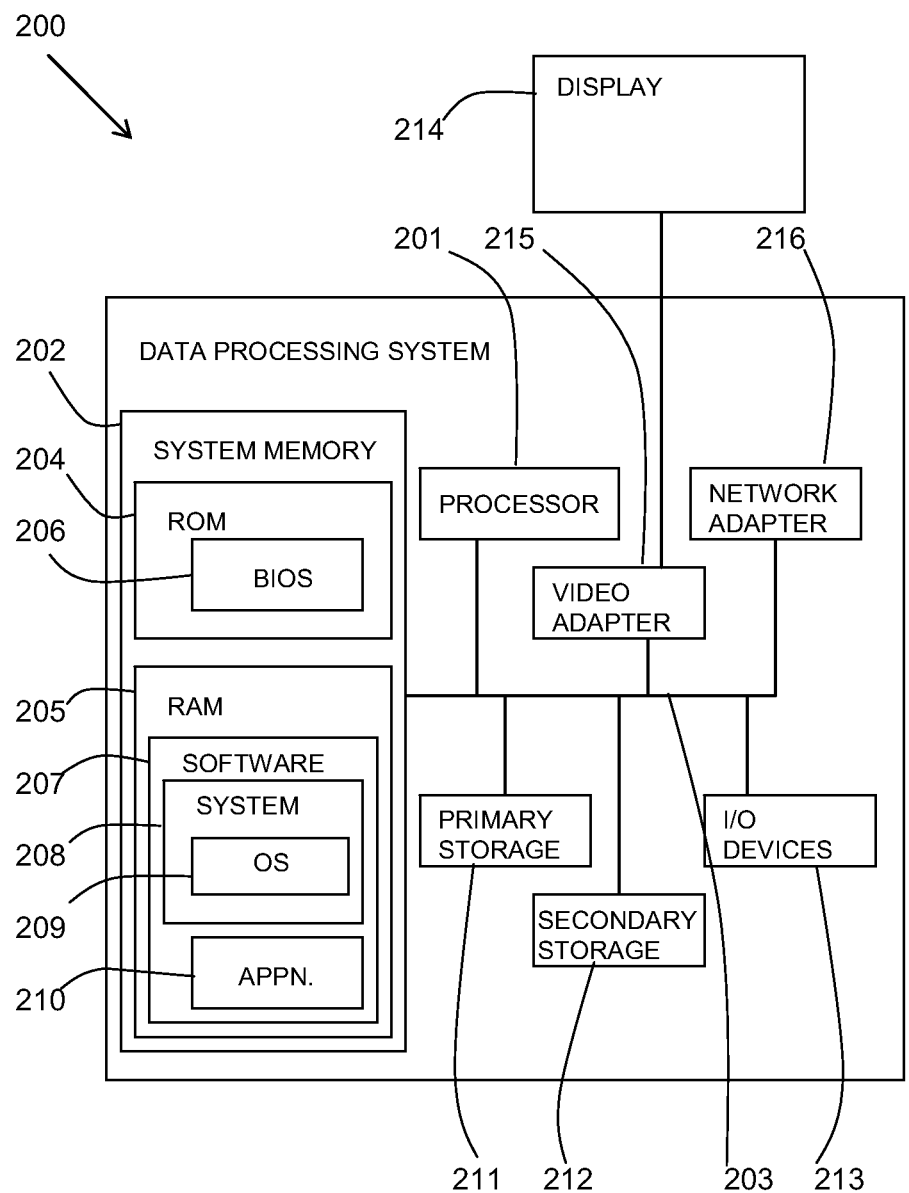
FIG. 2 is a block diagram of an embodiment of a computer system in which the present invention may be implemented.

Referring to FIG. 2, an exemplary system for implementing aspects of the invention includes a data processing system 200 suitable for storing and/or executing program code including at least one processor 201 coupled directly or indirectly to memory elements through a bus system 203. The memory elements may include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 209. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 may be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Referring to FIG. 3, a flow diagram 300 shows an embodiment of the described method at a publish/subscribe matching engine.

A durable subscription may be started 301 and a persistent parameter may be defined 302 for the durable subscription. When a subscribing application creates a durable subscription it has to provide some parameters describing the messages it wants to receive. As a minimum, it may give a topic string which tells the publish/subscribe engine which publications should be routed to this subscription. In the described method, the parameters may include an extra option as a persistent parameter, such as RETAIN=ALL or RETAIN=PERSISTENT-ONLY.

It may be determined 303 if the subscribing application is disconnected. If it is not disconnected, then all messages may be delivered 304. However, if the subscribing application is disconnected, a persistence filter may be applied 305 to determine if the message meets defined persistence requirements for the durable subscription.

Persistence requirements may include "quality of service" (QoS) which may typically have three values, 0, 1, 2. QoS 0 means non-persistent, QoS 2 means persistent. The odd one is QoS 1 which means that the message will definitely be delivered (as with QoS 2) but it may be delivered more than once. This extra piece of freedom makes life easier and quicker for the message passing software, but the price is that the receiving application has to be able to recognize (and consequently ignore) duplicate messages.

In the described method, QoS may be used as a form of persistence requirement and a subscriber making a durable subscription may include a parameter such as RETAIN=QoS1 meaning the subscription must keep QoS 1 and 2 messages for a disconnected application, but may discard QoS 0 messages.

If it is determined 306 that the message is persistent, it may be stored 308 awaiting the reconnection of the subscribing application. If the message is not persistent, it may be discarded 307.

It may then be determined 309 if the subscribing application is reconnected. If it is not yet reconnected, then a next message may be considered 310 for persistence. If the subscribing application is reconnected, the stored messages may be sent 311 to the subscribing application. The method may then loop to determine if the subscribing application is again disconnected 303.

The described method and system push the concept that non-persistent messages would be lost in the event of a system restart/failure, and provides a configurable mechanism to assert that when a durable subscriber is not currently attached that the non-persistent messages may simply be discarded at time of publication, which would have the same characteristics when a. subscribing application does not re-attach until after a. system restart.

The described method and system exploit a current understanding of non-persistent behavior by providing a configuration point to make these messages more volatile.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

Improvements and modifications can be made to the foregoing without departing from the scope of the present invention.

The invention claimed is:

1. A method for durable subscriptions in publish/subscribe messaging, the method comprising:
receiving a durable subscription for a subscribing application, wherein the durable subscription includes a parameter defining persistence for which a subscription is to be durable;
detecting whether the subscribing application is disconnected; responsive to detecting that the subscribing application is disconnected, applying a filter to messages to discard at a time of publication any non-persistent messages having a corresponding quality of service persistence requirement value specified by the subscribing application that identifies a message as a non-persistent message; and
retaining only persistent messages having a corresponding quality of service persistence requirement value specified by the subscribing application that identifies a message as a persistent message for delivery after the subscribing application is reconnected, wherein the corresponding quality of service persistence requirement value is one of a plurality of different quality of service persistence requirement values specified by the subscribing application that identifies a particular message as a persistent message, and wherein a specified quality of service persistence requirement value of the plurality of different quality of service persistence requirement values corresponding to the particular message allows the particular message having the specified quality of service persistence requirement value to be delivered more than once to the subscribing application;
wherein the parameter defining persistence is in a form of a property attached to the message.

2. The method of claim 1, further comprising:
detecting that the subscribing application is reconnected; and
delivering the retained persistent messages.

3. The method of claim 1, wherein the parameter defining persistence is a quality of service value.

4. A data processing system for durable subscriptions in publish/subscribe messaging, the data processing system comprising:
a bus system;
a storage device coupled to the bus system, wherein the storage device stores instructions; and a processor coupled to the bus system, wherein the processor executes the instructions to:

receive a durable subscription for a subscribing application, wherein the durable subscription includes a parameter defining persistence for which a subscription is to be durable;

detect whether the subscribing application is disconnected;

apply a filter to messages to discard at a time of publication any non-persistent messages having a corresponding quality of service persistence requirement value specified by the subscribing application that identifies a message as a non-persistent message in response to detecting that the subscribing application is disconnected; and retain only persistent messages having a corresponding quality of service persistence requirement value specified by the subscribing application that identifies a message as a persistent message for delivery after the subscribing application is reconnected, wherein the corresponding quality of service persistence requirement value is one of a plurality of different quality of service persistence requirement values specified by the subscribing application that identifies a particular message as a persistent message, and wherein a specified quality of service persistence requirement value of the plurality of different quality of service persistence requirement values corresponding to the particular message allows the particular message having the specified quality of service persistence requirement value to be delivered more than once to the subscribing application;

wherein the parameter defining persistence is in a form of a property attached to the message.

5. The data processing system of claim 4, wherein the processor further executes the instructions to:

detect that the subscribing application is reconnected; and deliver the retained persistent messages in response to the subscribing application being reconnected.

6. The data processing system of claim 4, wherein the parameter defining persistence is a quality of service value.

7. A computer program product for durable subscriptions in publish/subscribe messaging, the computer program product comprising: a computer readable storage medium readable by a processing circuit and storing instructions for execution by the processing circuit for performing a method of:

receiving a durable subscription for a subscribing application, wherein the durable subscription includes a parameter defining persistence for which a subscription is to be durable;

detecting whether the subscribing application is disconnected; responsive to detecting that the subscribing application is disconnected, applying a filter to messages to discard at a time of publication any non-persistent messages having a corresponding quality of service persistence requirement value specified by the subscribing application that identifies a message as a non-persistent message; and retaining only persistent messages having a corresponding quality of service persistence requirement value specified by the subscribing application that identifies a message as a persistent message for delivery after the subscribing application is reconnected, wherein the corresponding quality of service persistence requirement value is one of a plurality of different quality of service persistence requirement values specified by the subscribing application that identifies a particular message as a persistent message, and wherein a specified quality of service persistence requirement value of the plurality of different quality of service persistence requirement values corresponding to the particular message allows the particular message having the specified quality of service persistence requirement value to be delivered more than once to the subscribing application;

wherein the parameter defining persistence is in a form of a property attached to the message.

8. The computer program product of claim 7, further comprising:

detecting that the subscribing application is reconnected; and delivering the retained persistent messages.

9. The computer program product of claim 7, wherein the parameter defining persistence is a quality of service value.

* * * * *